United States Patent
Herrera Sierralta et al.

(10) Patent No.: US 12,066,133 B2
(45) Date of Patent: Aug. 20, 2024

(54) INTEGRALLY SELF-REINFORCED TRUNNION-TO-ELBOW PIPING SUPPORT APPARATUS

(71) Applicant: SAUDI ARABIAN OIL COMPANY, Dhahran (SA)

(72) Inventors: Carlos F. Herrera Sierralta, Dhahran (SA); Husain Al Muslim, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 196 days.

(21) Appl. No.: 17/649,478

(22) Filed: Jan. 31, 2022

(65) Prior Publication Data

US 2023/0243444 A1 Aug. 3, 2023

(51) Int. Cl.
*F16L 3/02* (2006.01)

(52) U.S. Cl.
CPC ...................................... *F16L 3/02* (2013.01)

(58) Field of Classification Search
CPC .............. F16L 3/02; F16L 43/001; F16L 9/04
USPC ................... 138/106, 107, 110, 172
See application file for complete search history.

(56) References Cited

U.S. PATENT DOCUMENTS

| | | | | |
|---|---|---|---|---|
| 1,576,307 A * | 3/1926 | Casey | ....................... | F16L 3/14 248/59 |
| 1,632,206 A * | 6/1927 | Tolman, Jr. | ................. | F23J 1/00 285/31 |
| 2,918,239 A * | 12/1959 | Wirth | ........................ | F16L 3/18 248/55 |
| 4,653,777 A * | 3/1987 | Kawatsu | .............. | B65G 53/523 285/55 |
| 4,951,902 A * | 8/1990 | Hardtke | ................ | F16L 3/1016 248/74.1 |
| 5,054,723 A | 10/1991 | Arnold | | |
| 5,381,833 A * | 1/1995 | Cummings | ........... | F16L 59/135 141/334 |
| 5,924,656 A * | 7/1999 | Okada | ....................... | F16L 3/00 248/58 |
| 2003/0127854 A1* | 7/2003 | Lehnhardt | ............... | F16L 21/06 285/181 |
| 2007/0221279 A1* | 9/2007 | Johnson | .................. | F16L 9/128 138/106 |

(Continued)

FOREIGN PATENT DOCUMENTS

| | | |
|---|---|---|
| CN | 202203516 U | 4/2012 |
| CN | 106523789 A | 3/2017 |
| KR | 20170053337 A | 5/2017 |

OTHER PUBLICATIONS

"RF Pad or Reinforcement Pad;" Nov. 24, 2021; pp. 1-22; Retrieved from the Internet: URL: https://whatispiping.com/reinforcing-pad/ (22 pages).

(Continued)

*Primary Examiner* — David R Deal (74) *Attorney, Agent, or Firm* — Osha Bergman Watanabe & Burton LLP (57) ABSTRACT

An apparatus to support a pipeline includes a self-reinforced pad, a tubular body with a tubular body outer diameter and a tubular body inner diameter, and a hub with a hub outer diameter and a hub inner diameter. The self-reinforced pad, tubular body, and hub are a single, integral component. The apparatus is connected to a trunnion.

20 Claims, 4 Drawing Sheets

(56) References Cited

U.S. PATENT DOCUMENTS

| | | | |
|---|---|---|---|
| 2009/0078832 A1* | 3/2009 | McIntosh | F16L 3/1226 |
| | | | 248/61 |
| 2016/0131280 A1* | 5/2016 | Brown | B29C 65/48 |
| | | | 29/525.11 |
| 2016/0160901 A1 | 6/2016 | Turley et al. | |
| 2020/0141519 A1* | 5/2020 | Su | F04B 53/16 |

OTHER PUBLICATIONS

First Examination Report issued in Saudi Arabia Application No. 123441151, dated Jan. 29, 2024 (6 pages).

* cited by examiner

INTEGRALLY SELF-REINFORCED TRUNNION-TO-ELBOW PIPING SUPPORT APPARATUS

BACKGROUND

Fluid transport systems use conduits such as pipelines to transport the fluids over long distances or between processing and storage devices. Herein, the term "fluid" is used to describe a substance that has no fixed shape and yields easily to external pressure, and, as such, the term "fluid" may be referring to gases, liquids, or a combination of both. The fluids that are transferred within the pipeline systems may be crude oil/wild crude, dry gas, wet gas, water, etc.

In some implementations, pipelines require support. The path of a pipeline, connection of a pipeline to other apparatuses, and the movement of the internal fluid may contribute to forces acting on a pipeline. Additional forces, such as gravity, and other external forces may act on a pipeline. To prevent undue and unwanted movement in a pipeline, the pipeline must be supported. Typically, a pipeline is supported by connecting portions of the pipeline to a base, such as a floor, wall, deck, another pipeline, or other rigid structure, such as scaffolding.

The connecting element, which connects the pipeline, or a portion of a pipeline, to the base is generally another pipe which does not carry a fluid. For clarity, the non-fluid-carrying pipe, or otherwise connecting element, is hereafter referred to as a "trunnion."

Often, the trunnion is fixedly attached to the pipeline via welding. To provide increased welding surface area and to reduce stress concentrations that may be incurred by the welding process, the attachment of the trunnion to the pipeline requires an additional component, known as a "reinforcement pad." The reinforcement pad is usually composed of the same material as the pipeline and trunnion, and an attempt is made to shape the reinforcement pad to match the curvature of the pipeline.

The connection of the pipeline to the trunnion is complicated near portions of the pipeline with complex geometries, such as a 90 degree turn, or "elbow" in the pipeline. In these cases, the reinforcement pad must match both the radial and longitudinal curvature of the pipeline to form an effective connection. To develop a compliant reinforcement pad, the current industry practice is to extract, or cut out, a reinforcement pad from another pipeline elbow known as a "donor" elbow. The donor elbow is normally a brand new and otherwise unused, portion of pipeline with the same metallurgy, diameter, and wall thickness as the pipeline to be supported.

After extraction of a reinforcement pad from a donor elbow or donor pipeline, the donor pipeline can no longer function as a pipeline. The extracted reinforcement pad is generally a small portion of the donor elbow or donor pipeline such that the resulting non-functional, or otherwise destroyed, donor elbow or donor pipeline represents wasted material with an associated negative environmental and financial impact. The environmental and financial impact is further compounded when considering the work involved with obtaining the reinforcement pad and the additional requirements of the disposal or removing of the damaged donor pipelines or donor elbows from the fabrication setting.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to an apparatus to support a pipeline. The apparatus includes a self-reinforced pad, a tubular body with a tubular body outer diameter and a tubular body inner diameter, and a hub with a hub outer diameter and a hub inner diameter. The self-reinforced pad, tubular body, and hub are a single, integral component. The apparatus is connected to a trunnion.

In general, in one aspect, embodiments relate to a method for supporting a pipeline via connection with a trunnion. The method includes providing an apparatus which includes a self-reinforced pad, a tubular body with a tubular body outer diameter and a tubular body inner diameter, and a hub with a hub outer diameter and a hub inner diameter. The self-reinforced pad, tubular body, and hub are a single, integral component known as the apparatus. The method further includes placing the apparatus on the pipeline, wherein the apparatus is oriented to provide support, and welding the self-reinforced pad of the apparatus to the pipeline with a fourth weld. The method further includes inserting the hub of the apparatus into the trunnion and welding the apparatus to the trunnion with a fifth weld. Further, the method includes ensuring the trunnion provides structural support by connecting the opposing end of the trunnion to a base.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
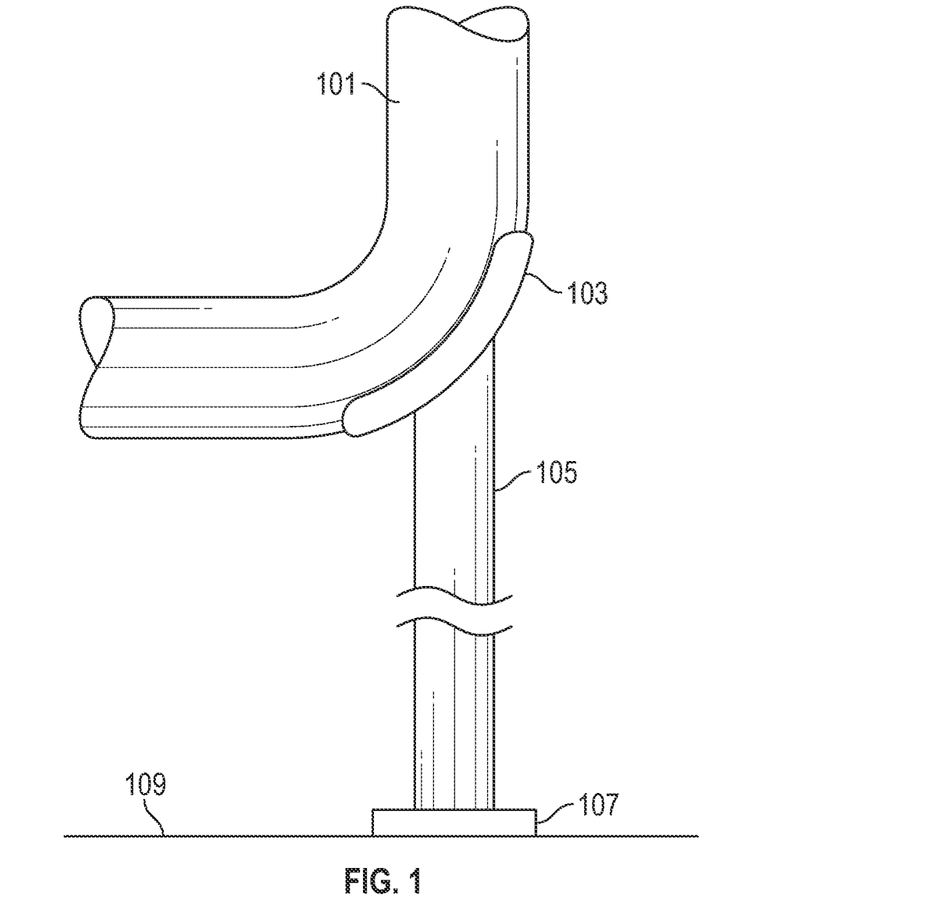
FIG. 1 shows the general components of a supported pipeline in accordance with one or more embodiments.

Embodiments disclosed describe an apparatus to connect a trunnion, or supporting member, to a pipeline. FIG. 1 displays a generic pipeline (101), where the portion of the pipeline (101) shown is supported. The portion of pipeline (101), as shown in FIG. 1, includes a 90 degree turn, also known as an elbow. However, in one or more embodiments, the pipeline may be straight or of a complex geometry.

The support is provided by a supporting member, known hereafter as a trunnion (105), which is typically a pipe but does not carry a fluid. The trunnion (105) is attached to the pipeline (101) by an attachment mechanism (103). The attachment mechanism (103) may be a weld directly connecting the pipeline (101) and trunnion (105), a collar, and may include additional material.

Generally, the trunnion is attached to a base (109) with a fastener (107). The base (109) may be any rigid structure capable of providing support to the pipeline, including, but not limited to, a floor, deck, wall, another pipeline, and scaffolding. The fastener (107) may be a fixed element, such as welding the trunnion directly to the base, a bracket, or a series of connecting bolts, or may be movable, through means of a dampening pad or sliding rail. Descriptions of the fastener are intentionally left general because the focus of the disclosure is the trunnion-to-pipeline attachment which operates independently from the fastener.

Figure 2A:
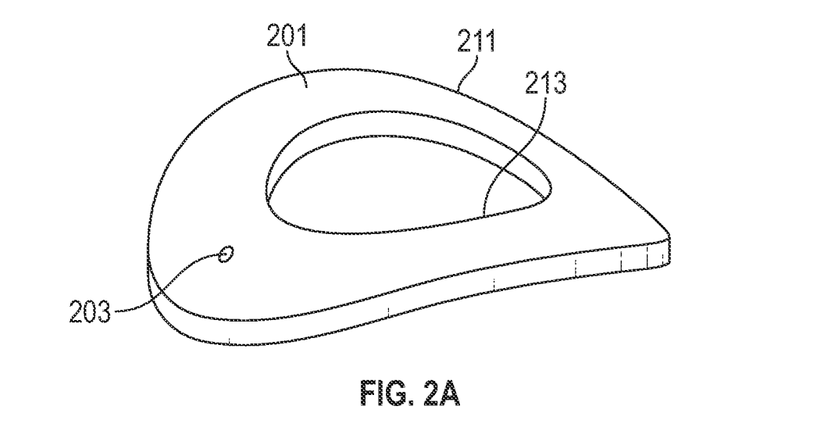
FIG. 2A displays a reinforcement pad for a portion of straight pipeline in accordance with one or more embodiments.

Often, the trunnion is fixedly attached to the pipeline via welding assuming compatible trunnion and pipeline materials. To provide increased welding surface area and to reduce stress concentrations that may be incurred by the welding process, the attachment (103) of the trunnion to the pipeline requires an additional component known as a reinforcement pad (201) as shown in FIG. 2A. The reinforcement pad (201) is usually composed of the same material as the pipeline (101) and trunnion (105) and is shaped to match the curvature of the pipeline (101). In one or more embodiments, the reinforcement pad (201) contains one or more vent holes (203), also known as weep holes or telltale holes. The vent holes (203) allow venting during heat treatments and welding and, additionally, may be used to reveal weld leakage. Typically, the vent holes (203) are sealed after welding to prevent unwanted contaminates, such as water, from entering between the reinforcement pad (201), pipeline (101), and trunnion (105).

Figure 2B:
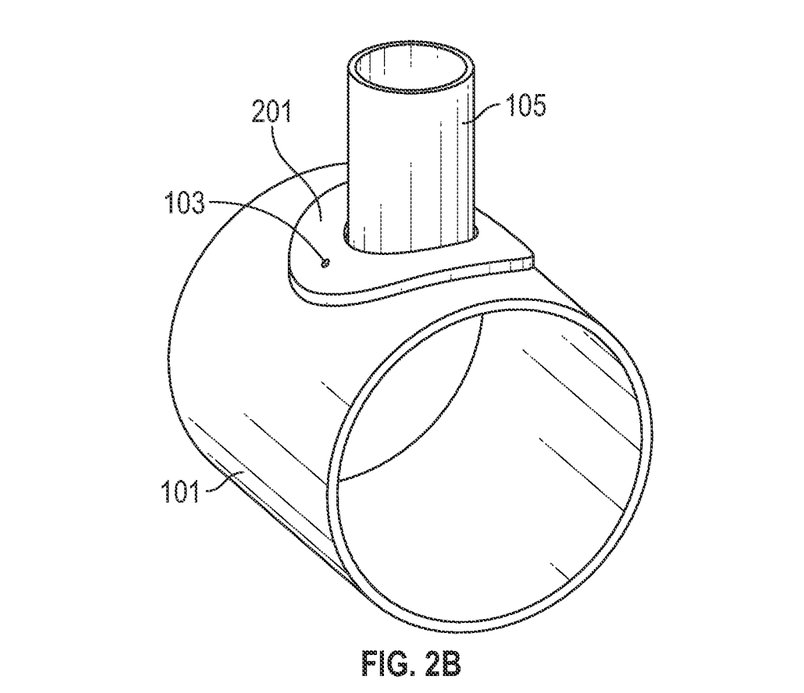
FIG. 2B demonstrates where a reinforcement pad is typically located in a supported pipeline system according to some embodiments.

For illustration purposes, FIG. 2B provides an example of where the reinforcement pad (201) is located relative to the trunnion (105) and pipeline (101). Again, the pipeline (101) in FIG. 2B is shown as straight, but, in one or more embodiments, may be an elbow or other complex geometry.

Figure 2C:
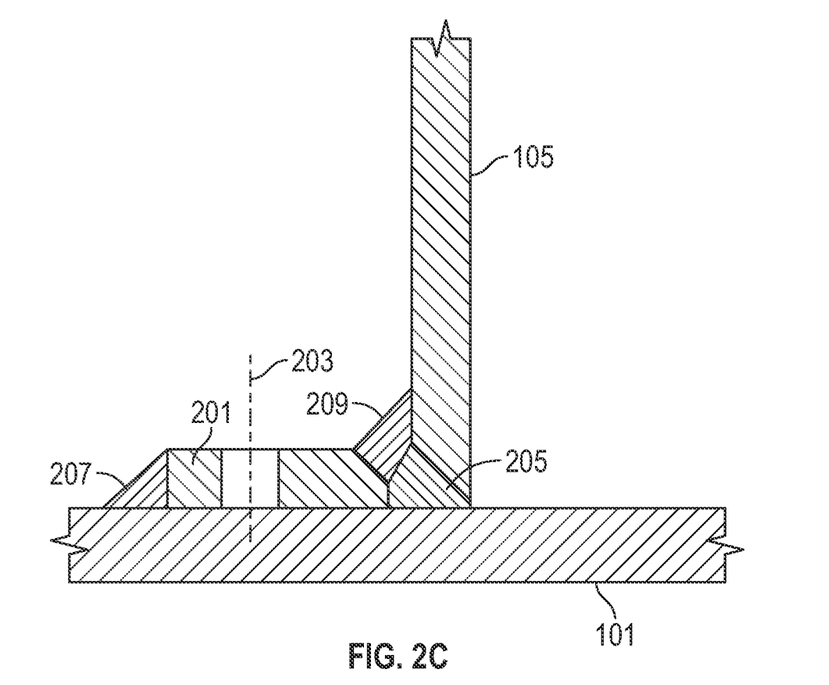
FIG. 2C is a detailed view of the welds used in a supported pipeline with a reinforcement pad in accordance with one or more embodiments.

As noted, the reinforcement pad (201) is welded to the pipeline (101) and trunnion (105). FIG. 2C is a detailed view of a cross-section of a pipeline-trunnion-reinforcement pad intersection showing the location of the welds. For clarity, only a portion of the cross-section is shown in FIG. 2C. Generally, three welds are required to adequately connect the pipeline (101), trunnion (105), and reinforcement pad (201). A first weld (205) joins the pipeline (101) to the trunnion (105). A second weld (207) is placed around the outer diameter (211) of the reinforcement pad (201) to create a connection to the pipeline (101). Finally, a third weld (209) is located at the inner diameter (213) of the reinforcement pad (201) to form a connection with the trunnion (105).

Figure 2D:
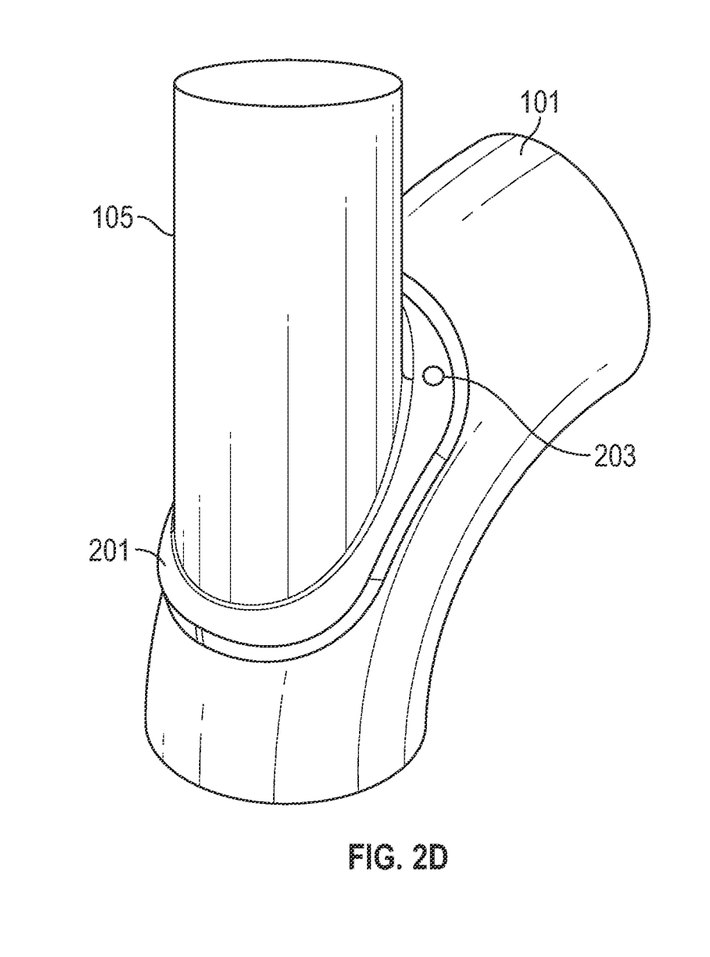
FIG. 2D shows a supported pipeline with a reinforcement pad where the supported portion of the pipeline is an elbow according to one or more embodiments.

The connection of the pipeline (101) to the trunnion (105) is complicated near portions of the pipeline with complex geometries, such as a 90 degree turn, or elbow in the pipeline. In these cases, the reinforcement pad (201) must match both the radial and longitudinal curvature of the pipeline (101) to form an effective connection as shown in FIG. 2D. To develop a compliant reinforcement pad (201), the current industry practice is to extract, or cut out, a reinforcement pad (201) from another pipeline elbow known as a "donor" elbow. The donor elbow is normally a brand new, and otherwise unused, portion of pipeline with the same metallurgy, diameter, and wall thickness as the pipeline (101) to be supported.

After extraction of a reinforcement pad (201) from a donor elbow or donor pipeline, the donor pipeline can no longer function as a pipeline. The extracted reinforcement pad (201) is generally a small portion of the donor elbow or donor pipeline such that the resulting non-functional, or otherwise destroyed, donor elbow or donor pipeline represents wasted material with an associated negative environmental and financial impact. Additionally, because the donor elbow or donor pipeline is typically the same pipeline, in terms of diameter, wall thickness, and composition, the extracted reinforcement pad (201) does not perfectly mate with the curvature of the pipeline (101). This is because a reinforcement pad (201) with the same diameter as the pipeline (101) cannot "wrap around" the pipeline (101). Consequently, it is not uncommon for gaps to form in the second weld (207), or the other welds, when connecting the reinforcement pad (201), trunnion (105), and pipeline (101). These gaps may cause stress concentrations eventually resulting in cracks and rupture of the pipeline (101) and the leakage of the carried fluid.

Figure 3:
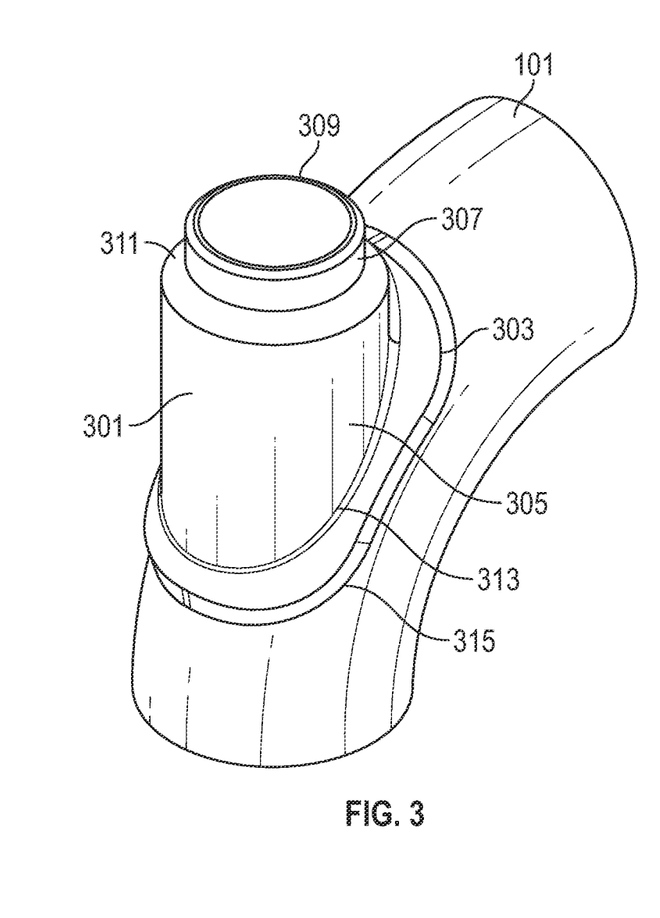
FIG. 3 is an apparatus in accordance with one or more embodiments.

In view of the above, in one aspect, one or more embodiments disclosed herein relate to an apparatus to connect a trunnion (105) and a pipeline (101). One such embodiment of the apparatus (301) is shown in FIG. 3. Although details and features of the apparatus (301) will be called out and further described by a self-imposed nomenclature, it is emphasized that the apparatus (301) is an integral, or whole, part and is not composed of separate, or distinct, elements.

In accordance with one or more embodiments, and as shown in FIG. 3, the apparatus (301) consists of a self-reinforced pad (303), a body (305), and a hub (307). The term "self-reinforced" is used to describe the self-reinforced pad (303) of the apparatus (301) because no weld, or other connection mechanism, is required between the self-reinforced pad (303) and the body (305) of the apparatus (301) due to the apparatus (301) being integral. This is in contrast to the previously described pipeline-trunnion-reinforcement pad system which would require a first weld (205) and a third weld (209) near this location.

The self-reinforced pad (303) is contoured to adequately mate with the pipeline (101). The contour of the self-reinforced pad (303) accounts for both the longitudinal and radial curvatures of the pipeline (101), in the case of an elbow in the pipeline, as seen in FIG. 3. In one or more embodiments, the contour is constructed to adequately mate with straight portions or other complex geometries of a pipeline (101).

The self-reinforced pad (303) is fixedly connected to the pipeline (101) by means of a fourth weld (not shown) proximate to the outer edge of the self-reinforced pad (303) and the junction of the outer edge with the pipeline (101). In one or more embodiments, the fourth weld is similar to the second weld (207) of FIG. 2C. In one or more embodiments, the self-reinforced pad (303) contains one or more vent holes (203).

Returning to FIG. 3, the apparatus (301) has a hub (307). The hub (307) is tubular and concentric with the body (305) of the apparatus (301), but has a reduced diameter. As such, the hub (307) may be inserted into a trunnion (105) assuming the trunnion (105) is also tubular, or near tubular. In one or more embodiments, the outer diameter of the hub (307) is the same size, or slightly smaller, than the inner diameter of the accepting trunnion (105). Likewise, in one or more embodiments, the outer diameter of the body (305) is the same, or close to the same, as the outer diameter of the trunnion (105). In the embodiment shown, as is visible from the outside of the apparatus (301), the body (305) and the trunnion (105) form a flush connection with only one seam once the hub (307) is inserted into the trunnion (105). Once the hub (307) is inserted into the trunnion (105), a fifth weld (not shown) near the seam formed by the body (305) and the trunnion (105) is used to fixedly attach the apparatus (301) and the trunnion (105). In one or more embodiments, such a configuration allows for the fifth weld to be a butt weld.

In one or more embodiments, the end (309) of the hub (307) is beveled to assist in the insertion of the apparatus (301) into the trunnion (105) and aid the subsequent fifth weld. In one or more embodiments, the bevel has a bevel angle of 37.5 degrees. The reduction in diameter between from the body (305) to the hub (307) of the apparatus (301) is done by a chamfer (311). In one or more embodiments, the chamfer (311) has an angle of 45 degrees.

In one or more embodiments, using a combination of analytical estimates, phenomenological models, and finite element analysis, the location of the body (305) with respect to the self-reinforced pad (303), the junction (313) of the body (305) and the self-reinforced pad (303), the junction (315) of the self-reinforced pad (303) and the pipeline (101), as well as the chamfer (311) and bevel at the end (309) may be elected to minimize stress concentrations within the apparatus (301) while supporting a load, forces, or moments, from the pipeline (101) or other external elements or forces. It is emphasized that the apparatus (301) is integral, as such, the body-reinforced pad junction (313) is labelled only for reference purposes.

One or more embodiments of the present disclosure may provide at least one of the following advantages. Although not yet explicitly stated, the apparatus (301) is not limited to any specific body (305) diameter, hub (307) diameter, or self-reinforced pad (303) curvature. The apparatus (301) is manufactured to conform to pipeline (101) and trunnion (105) as specified by a pipeline engineer. The apparatus may be manufactured to accommodate standardized pipeline (101) diameters and geometries and standardized trunnion (105) diameters and geometries, or may be manufactured for custom pipeline (101) and trunnion (105) diameters and geometries. Because the apparatus is manufactured according to the specified pipeline (101) and trunnion (105) requirements, the need to extract a reinforcement pad (201) from a donor elbow or donor pipeline is obviated; consequently reducing waste and lowing the environmental and financial impact, such as the time and labor required to extract a reinforcement pad (201) from a donor elbow or donor pipeline, created by using donor elbows or donor pipelines. Additionally, because the self-reinforced pad (303) adequately mates with the pipeline (101), gaps in the fourth weld, which connects the self-reinforced pad (303) to the pipeline (101), are eliminated. Therefore, by eliminating said gaps, stress-concentrations which may lead to leakage, and eventual failure in the pipeline, do not originate in the fourth weld.

The apparatus (301) may be installed using only two welds; namely, the fourth weld, which connects the self-reinforced pad (303) to the pipeline (101), and the fifth weld, which connects the apparatus (301) to a trunnion (105). This is in contrast to the three welds required by the traditional pipeline-trunnion-reinforcement pad system previously detailed. The reduction in the number of welds required for installation proportionally reduces the number of man-hours required to support a pipeline (101).

Because the connection between the apparatus (301) and the trunnion (105) may be done with a butt weld (the fifth weld), as facilitated by the hub (307), this weld may be examined by radiographic inspection, such as X-rays. Radiographic inspection allows for non-destructive examination of welds and greatly aids in continual, and periodic, monitoring of the pipeline (101), and the supporting structures of the pipeline, for structural health. Such inspections may be used to alert pipeline engineers of maintenance needs.

Finally, because the apparatus (301) is designed to reduce stress concentrations forming within the apparatus (301) itself, such as the junction of the body (305) and the self-reinforced pad (303), or at junctions between the part and the pipeline (101) or trunnion (105), the apparatus (301) may accommodate larger loads, forces, and moments as necessitated by the pipeline (101) and trunnion (105) without failure. Additionally, the mitigation of stress concentrations promotes robustness to fatigue and subsequent increase in the expected lifetime of the apparatus (301).

Figure 4:
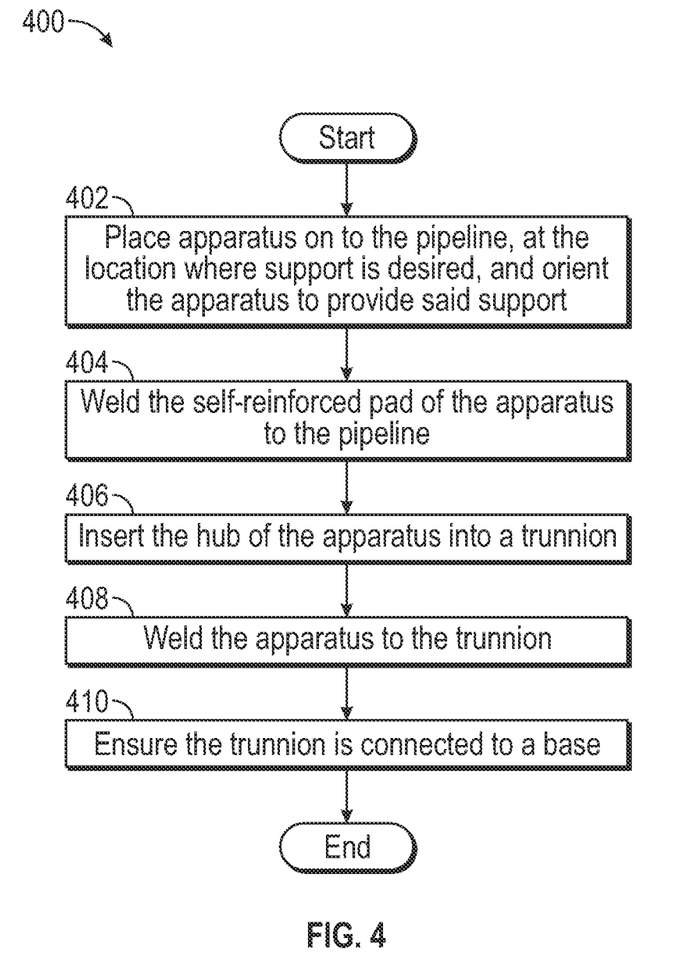
FIG. 4 is a flowchart in accordance with one or more embodiments.

In accordance with one or more embodiments, FIG. 4 illustrates a method of installation (400) for the apparatus (301). As shown in block 402, the apparatus (301) is placed on the pipeline at the location where support is desired. While intuitive, it is explicitly noted that the apparatus (301), in addition to being placed at the location on the pipeline where support is desired, must also first be selected such that the apparatus, and thus its associated self-reinforced pad, adequately mates with the pipeline and be oriented in such a way to provide said support. Once the apparatus (301) is properly placed and supported, the self-reinforced pad (303) portion of the apparatus (301) is welded to the pipeline by a fourth weld as described in block 404. According to block 406, the hub (307) portion of the apparatus (301) is inserted into, or otherwise made to contact, a trunnion (105). After insertion, the apparatus (301) is welded to the trunnion (105) with a fifth weld as described in block 408. Finally, as stated in block 410, the user or installer ensures that the trunnion (105) is adequately connected to, and supported by, a base (109); otherwise, the apparatus (301) cannot provide support to the pipeline.

While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. An apparatus to support a pipeline via connection with a trunnion, comprising:
    a tubular body with a first end and a second end and having a tubular body outer diameter and a tubular body inner diameter;
    a self-reinforced pad disposed at the first end of the tubular body, the self-reinforced pad configured to conform and mate with an outer surface of the pipeline; and
    a tubular hub disposed at the second end with a hub outer diameter, the tubular hub concentric with the tubular body,
    wherein the self-reinforced pad, tubular body, and hub are a single, integral component.

2. The apparatus of claim 1, comprising a first junction between the self-reinforced pad and the pipeline.

3. The apparatus of claim 1, comprising a second junction between the self-reinforced pad and the body.

4. The apparatus of claim 2, wherein the first junction is shaped to mitigate stress concentrations in welds connecting the pipeline and the self-reinforced pad.

5. The apparatus of claim 3, wherein the second junction is shaped to mitigate stress concentrations within the apparatus.

6. The apparatus of claim 1, comprising a chamfer between the body and hub.

7. The apparatus of claim 6, wherein the chamfer is a 45 degree chamfer.

8. The apparatus of claim 1, comprising a bevel on the trunnion-facing end of the hub.

9. The apparatus of claim 8, wherein the bevel has an angle of 37.5 degrees.

10. The apparatus of claim 1, wherein the tubular body outer diameter is greater than the hub outer diameter.

11. The apparatus of claim 1, wherein the tubular body outer diameter is equal to an outer diameter of the trunnion.

12. The apparatus of claim 1, wherein the hub outer diameter is equal to, or nominally less than, an inner diameter of the trunnion.

13. The self reinforced pad apparatus of claim 1, further comprising a vent hole in the self-reinforced pad.

14. The apparatus of claim 1, wherein the self-reinforced pad is contoured to adequately mate with a pipeline where the pipeline has a 90 degree turn.

15. A method for supporting a pipeline via connection with a trunnion, comprising:
    an apparatus comprising:
        a tubular body with a first end and a second end and having a tubular body outer diameter and a tubular body inner diameter,
        a self-reinforced pad disposed at the first end of the tubular body, the self-reinforced pad configured to conform and mate with an outer surface of the pipeline, and
        a tubular hub disposed at the second end with a hub outer diameter, the tubular hub concentric with the tubular body,
        wherein the self-reinforced pad, tubular body, and hub are a single, integral component;
    placing the apparatus on the pipeline oriented to provide support;
    welding the self-reinforced pad of the apparatus to the pipeline with a fourth first weld;
    inserting the hub of the apparatus into the trunnion;
    welding the apparatus to the trunnion with a second weld; and
    ensuring the trunnion provides structural support, wherein the opposing end of the trunnion is connected to a base.

16. The method of claim 15, further comprising selecting an apparatus, and thus an associated self-reinforced pad, that adequately mates with the pipeline.

17. The method of claim 16, wherein the apparatus is selected such that the tubular body outer diameter is equal to the outer diameter of a trunnion.

18. The method of claim 16, wherein the apparatus is selected such that the hub outer diameter is equal to the inner diameter of a trunnion.

19. The method of claim 15, wherein the second weld is a butt weld.

20. The method of claim 15, further comprising fixedly attaching the opposing end of the trunnion to the base.

* * * * *

UNITED STATES PATENT AND TRADEMARK OFFICE
CERTIFICATE OF CORRECTION

| | |
|---|---|
| PATENT NO. | : 12,066,133 B2 |
| APPLICATION NO. | : 17/649478 |
| DATED | : August 20, 2024 |
| INVENTOR(S) | : Carlos F. Herrera Sierralta et al. |

It is certified that error appears in the above-identified patent and that said Letters Patent is hereby corrected as shown below:

In the Claims

At Column 8, Claim number 13, Line number 6, "self reinforced pad" should be removed.

At Column 8, Claim number 15, Line number 30, "fourth" should be removed.

Signed and Sealed this
Twelfth Day of November, 2024

*Katherine Kelly Vidal*

Katherine Kelly Vidal
*Director of the United States Patent and Trademark Office*